United States Patent
Fan et al.

(10) Patent No.: US 11,174,576 B2
(45) Date of Patent: *Nov. 16, 2021

(54) EASY-TO-DYE DEGRADABLE POLYESTER FDY AND PREPARING METHOD THEREOF

(71) Applicant: JIANGSU HENGLI CHEMICAL FIBRE CO., LTD., Wujiang (CN)

(72) Inventors: Hongwei Fan, Wujiang (CN); Fangming Tang, Wujiang (CN); Shanshui Wang, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/253,623

(22) PCT Filed: Oct. 28, 2019

(86) PCT No.: PCT/CN2019/113599
§ 371 (c)(1),
(2) Date: Dec. 18, 2020

(87) PCT Pub. No.: WO2020/134487
PCT Pub. Date: Jul. 2, 2020

(65) Prior Publication Data
US 2021/0246579 A1 Aug. 12, 2021

(30) Foreign Application Priority Data

Dec. 27, 2018 (CN) .......................... 201811613993.4

(51) Int. Cl.
*D01F 6/92* (2006.01)
*C08G 63/183* (2006.01)
*C08G 63/86* (2006.01)
*D01F 1/10* (2006.01)

(52) U.S. Cl.
CPC .............. *D01F 6/92* (2013.01); *C08G 63/183* (2013.01); *C08G 63/866* (2013.01); *D01F 1/10* (2013.01)

(58) Field of Classification Search
USPC ............ 264/210, 211.24; 528/190, 193, 194, 528/271, 272, 273, 274
See application file for complete search history.

(56) References Cited

U.S. PATENT DOCUMENTS

| | | | | |
|---|---|---|---|---|
| 2011/0301305 A1* | 12/2011 | Isono | ................. | C08G 63/6826 525/434 |
| 2021/0087716 A1* | 3/2021 | Yin | .......................... | D01F 6/92 |

FOREIGN PATENT DOCUMENTS

| | | | | |
|---|---|---|---|---|
| CN | 1878821 A | 12/2006 | | |
| CN | 106367835 A | 2/2017 | | |
| CN | 107365429 A | 11/2017 | | |
| CN | 109735925 A | 5/2019 | | |
| CN | 109735927 A | 5/2019 | | |
| CN | 109735941 | * 5/2019 | ............... | D01F 6/92 |
| CN | 109750379 | * 5/2019 | ............... | D01F 6/92 |
| KR | 20160081624 A | 7/2016 | | |

* cited by examiner

*Primary Examiner* — Terressa Boykin
(74) *Attorney, Agent, or Firm* — Bayramoglu Law Offices LLC

(57) ABSTRACT

A type of easy-to-dye degradable polyester FDY and preparing method thereof are disclosed. The method for preparing an easy-to-dye degradable polyester FDY is to prepare a modified polyester FDY from a modified polyester melt with FDY process; wherein the material is a modified polyester; wherein the modified polyester has a molecular chain structure composed of terephthalic acid segments, ethylene glycol segments, 2,2,3,4,5,5-hexamethyl-3,4-hexanediol segments and tert-butyl branched heptanediol segments; wherein the modified polyester is dispersed by solid heteropolyacid powder calcined at a 400~700° C. temperature. The preparing method has a simple process, modifying the polyester through solid heteropolyacid, tert-butyl branched heptanediol and 2,2,3,4,5,5-hexamethyl-3,4-hexanediol, which increases the hydrolysis rate of the polyester, improves the dyeing performance and prepares products with excellent mechanical properties.

16 Claims, No Drawings

EASY-TO-DYE DEGRADABLE POLYESTER FDY AND PREPARING METHOD THEREOF

CROSS REFERENCE TO THE RELATED APPLICATIONS

This application is the national phase entry of International Application No. PCT/CN2019/113599, filed on Oct. 28, 2019, which is based upon and claims priority to Chinese Patent Application No. 201811613993.4, filed on Dec. 27, 2018, the entire contents of which are incorporated herein by reference.

TECHNICAL FIELD

The present invention belongs to the field of polyester fiber, and more particularly, relates to one type of easy-to-dye degradable polyester FDY and preparing method thereof.

BACKGROUND

Polyethylene terephthalate (PET) is a polymer with excellent performances. Because of its high modulus, high strength, good shape retention and good barrier properties, PET is widely applied in the fields of fibers, packaging, thin films and sheets, whose output has been increasing year by year, and industry status has been significantly improved. At present, the production of polyester fiber is developing towards functionalization and differentiation, which is mainly modifying polyester to prepare a fiber with special properties, such as an antistatic fiber, an anti-pilling fiber, an elastic fiber, a high moisture absorption fiber, a thermal insulation fiber, an antibacterial and deodorant fiber, a discoloration fiber, etc.

However, the polyester is a hydrophobic fiber, the molecule does not contain hydrophilic groups, and its molecular structure also lacks active groups that can bind to dyes, resulting in poor dyeing performance. In addition, the finished polyester fiber has a partially crystalline supramolecular structure, of which the molecular chains are parallel to each other, mostly in the trans-conformation, while the amorphous regions are mostly in the cis-conformation with compact molecular arrangement, which makes the dyeing of polyester fiber harder. The conventional PET fiber is usually dyed with disperse dyes at high temperature (≥130° C.) and high pressure, which not only increases the complexity of the process, but also causes higher equipment requirement, higher production costs and poorer dyeing performance, limiting the application of colorful polyester fiber to a certain extent. To overcome these defects, technicians have done a lot of research and found an effective method to modify polyester. That is, the prior art adds a third monomer sodium ethylene isophthalate sulfonate, to introduce the polar group of cationic dyes into the molecular chain for dyeing to improve dyeability, obtaining a new type of polyester fabric with uniform color, high color fastness, and washing resistance. However, since the supramolecular structure of the fiber in this method is still very similar to that of conventional polyester, and cationic dyes have low accessibility to sulfonic acid-based dye seats, the same high temperature and high pressure dyeing method as conventional polyester fibers is still required.

In addition, with the rapid development of PET industry, although PET will not directly cause harm to the environment, the difficulties in the PET waste treatment cause a globally environmental pressure due to its huge amount and strong resistance to atmospheric and microbial degradation. In practical application, chemical degradation methods are mostly used for PET, including hydrolysis and alcoholysis, as well as ammonolysis, amination and pyrolysis, however, they are still far from solving the recycling of a large number of clothing due to slow degradation efficiency and so on. As a matter of fact, the natural degradation of clothing polyester fiber (PET filament) has become an urgent problem in view of the needs of environmental protection, resource conservation and sustainable development.

Therefore, it is of great significance to develop one type of easy-to-dye degradable polyester FDY with excellent dyeing performance and high degradation efficiency as well as preparing method thereof.

SUMMARY

The primary object of the present invention is to provide one type of easy-to-dye degradable polyester FDY with excellent dyeing performance and high degradation efficiency as well as preparing method thereof, so as to overcome inadequacies in the prior art.

The preparing method of an easy-to-dye degradable polyester FDY is to prepare the modified polyester FDY, that is the easy-to-dye degradable polyester FDY from the modified polyester melt with FDY process;

wherein the modified polyester is a product of esterification and successive polycondensation reactions of an evenly mixed terephthalic acid, ethylene glycol, 2,2,3,4,5,5-hexamethyl-3,4-hexanediol, tert-butyl branched heptanediol and solid heteropolyacid powder calcined at a high temperature;

The structural formula of 2,2,3,4,5,5-hexamethyl-3,4-hexanediol is as follows:

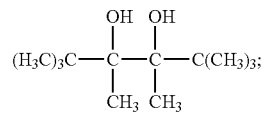

The present invention modifies the polyester with 2,2,3,4,5,5-hexamethyl-3,4-hexanediol, which can significantly increase the free volume of polyester, especially that the presence of tert-butyl in 2,2,3,4,5,5-hexamethyl-3,4-hexanediol changes activity of the main chain, thereby changing the interaction force and the distance between the molecular chain units, increasing the free volume of the void of the modified polyester, which will reduce the difficulty of dye molecules penetrating into the modified polyester, improve dyeing performance, reduce dyeing temperature, shorten dyeing time and reduce energy consumption;

The structural formula of tert-butyl branched heptanediol is as follows:

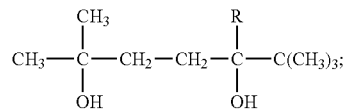

with R standing for —H, —CH$_2$CH$_3$, —CH(CH$_3$)$_2$ or —C(CH$_3$)$_3$, which will respectively form 2,6,6-trimethyl-2,5-heptanediol, 2,6,6-trimethyl-5-ethyl-2,5-heptanediol, 2,6,6-trimethyl-5-isopropyl-2,5-heptanediol or 2,6,6-trimethyl-5-tert-butyl-2,5-heptanediol.

The present invention introduces tert-butyl branched heptanediol segments into the molecular chains of the modified polyester. The presence of tert-butyl in tert-butyl branched heptanediol changes activity of the main chain, thereby changing the interaction force and the distance between the molecular chain units, increasing the free volume of the void of the modified polyester, which is conducive for part of dye molecules to diffuse into the fiber gap, increase dye uptake, reduce dyeing temperature, shorten dyeing time and reduce the effect of dyeing on the mechanical properties of polyester fibers;

The solid heteropolyacid is calcined at 400-700° C. temperature, comprising more than one of $SiO_2$—$TiO_2$, $SiO_2$—$ZrO_2$, $B_2O_3$—$Al_2O_3$, $TiO_2$—ZnO, and $SiO_2$—CaO; the high temperature calcining is aimed to remove impurities in the polyester, leading to decomposition and activation of catalyst intermediate (during the process from the catalyst precursor to the catalyst, the precursor undergoes oxidation and reduction reactions. The catalyst intermediate refers to the substance in the process, and the composition is uncertain, which is a general reference). The high temperature of calcining mainly meets the decomposition and activation conditions of the catalyst intermediate, which can be adjusted within a certain range but not too large. If the temperature is too high, part of the $SiO_2$ will gasify and affect the set ratio, and if the temperature is too low, the decomposition and activation conditions of the catalyst intermediate cannot be reached;

Since the terminal carboxyl group in the polyester system is the first position where the polyester hydrolysis occurs, the unshared electron pair on the hydroxyl oxygen atom in the carboxyl group is conjugated with the π electron of the carbonyl group, and the electron delocalization occurs, resulting in weakening of the hydrogen-oxygen bond force and dissociating the carboxylic acid into anions and protons. The carboxyl anion generated after the dissociation also distributes the negative charge of the carboxyl group evenly on the two oxygen atoms due to the delocalization of the electrons, which increases the stability of the carboxyl anion and is conducive to the dissociation of carboxylic acid into ions. In the polyester preparing process, the present invention introduces solid heteropolyacid to dissociate and produce $H^+$ ions, which can attack carboxyl anions to generate tetrahedral intermediates with positive ions, so that the carbonyl oxygen is protonated. It is positively charged to attract the electrons on the carbonyl carbon, making the carbonyl carbon have positive charge and easier to be attacked by nucleophilic reagent with weaker alkaline (such as $H_2O$). After the attack, the acyloxy group of the tetrahedral intermediate is broken and decomposed into acid and alcohol. In this cycle, the carbonyl group and the macromolecular chain are continuously destroyed, and the terminal carboxyl group content is continuously increased, which further promotes the hydrolysis of the polyester and increases the hydrolysis rate.

The following preferred technology program is presented to give a detailed description for the preparing method of an easy-to-dye degradable polyester FDY:

wherein the synthesis of 2,2,3,4,5,5-hexamethyl-3,4-hexanediol is the product of cooling, crystallization and refining of evenly mixed palladium acetate and di-tert-butyl dimethyl ethylene, under heating and stirring conditions, adding a 10-15% mass concentration of hydrogen peroxide solution and reacting at 70-75° C. for 3-4 h, wherein the mass ratio of di-tert-butyl dimethyl ethylene, hydrogen peroxide solution and palladium acetate is 1:1.5-2.0:0.015;

wherein the tert-butyl branched heptanediol is synthesized by means of:
(1) mixing isobutanol and 40-50% of KOH aqueous solution in the molar ratio of isobutanol to KOH as 5-6:1, then carrying out the reaction with a stirring at 100-110° C. for 4-5 h to obtain potassium isobutanol;
(2) removing the impurities from the system in step (1) and down to room temperature, then adding in xylene in the molar ratio of potassium isobutanol to xylene as 1.3-1.5:2.0-3.0 and cooling to 0-5° C.;
(3) adding 3-methyl-3-hydroxybutyne and M into the system of step (2) in a molar ratio of 3-methyl-3-hydroxybutyne:M:xylene as 1:1.2-1.3:2.0-3.0, then starting the reaction at 25-35° C. for 3 h, and obtaining octyne diol after cooling and crystallization, centrifugation and drying;
(4) mixing octyne diol, ethanol and palladium catalyst in a weight ratio of 2-3:10:0.01-0.03, then carrying out the reaction accompanied with a continuous hydrogen input at 40-50° C. for 50-60 min, and obtaining the tert-butyl branched heptanediol after separation and purification;
wherein the structural formula of tert-butyl branched heptanediol is with R standing for —H, —$CH_2CH_3$, —$CH(CH_3)_2$ or —$C(CH_3)_3$, while M is 2,2-dimethyl-propionaldehyde, 2,2-dimethyl-3-pentanone, 2,2,4-trimethyl-3-pentanone or 2,2,4,4-tetramethyl-3-pentanone;
wherein the time during calcining at a high temperature is 2-4 h; the content of $TiO_2$, $ZrO_2$, $Al_2O_3$, ZnO and CaO in $SiO_2$—$TiO_2$, $SiO_2$—$ZrO_2$, $B_2O_3$—$Al_2O_3$, $TiO_2$—ZnO, and $SiO_2$—CaO is respectively 30-50 wt %, 30-50 wt %, 20-40 wt %, 20-40 wt % and 20-50 wt %; wherein the solid heteropolyacid powder calcined at a high temperature is crushed into powder with an average size of less than 0.5 μm.
wherein the preparing method of easy-to-dye degradable polyester FDY includes a modified polyester manufacturing process composed of following steps:
(1) Esterification
concocting terephthalic acid, ethylene glycol, 2,2,3,4,5,5-hexamethyl-3,4-hexanediol and tert-butyl branched heptanediol into a slurry, and adding in solid heteropolyacid powder calcined at a high temperature, catalyst, matting agent and stabilizer, then carrying out the esterification under a nitrogen pressure ranged from atmospheric pressure to 0.3 MPa, while reaction temperature is 250-260° C., finally ending the esterification when a water distillation rate reaches higher than 90% of a theoretical value;
(2) Polycondensation
after smoothly reducing the nitrogen pressure from normal value to less than 500 Pa within 30-50 min, conducting a low vacuum polycondensation for the esterification products at 250-260° C. for 30-50 min, then further reducing the pressure to less than 100 Pa and continuing the high vacuum polycondensation at 270-282° C. for 50-90 min.
wherein the molar ratio of the terephthalic acid and the ethylene glycol is 1:1.2-2.0, a total addition of the 2,2,3,4,5,5-hexamethyl-3,4-hexanediol and the tert-butyl branched heptanediol is 3-5 mol % of the amount of the terephthalic acid, wherein the molar ratio of the 2,2,3,4,5,5-hexamethyl-3,4-hexanediol and the tert-butyl branched heptanediol is 2-3:3-5, wherein the additions of the solid heteropolyacid powder calcined at a high temperature, the catalyst, the matting agent and the stabilizer are 0.03-0.05 wt %, 0.03-0.05 wt %, 0.20-0.25 wt % and 0.01-0.05 wt % of the amount of terephthalic acid respectively. The addition of solid heteropolyacid in the present invention is not limited to the above, and can be adjusted within a certain range by technicians in this field according to the actual condition, If the amount is too large, it will cause too much damage on the regularity of the polyester molecular structure and too much influence on the crystallinity and mechanical properties of the fiber, which is not conducive to the production and application of the fiber; whereas if the amount is too small, the improvement of the dyeing effect is not obvious.

wherein the catalyst is antimony trioxide, antimony glycol or antimony acetate, the matting agent is titanium dioxide, and the stabilizer is triphenyl phosphate, trimethyl phosphate or trimethyl phosphite.

wherein the modified polyester has a molecular weight of 17000-19000 Da and a molecular weight distribution index of 2.0-2.4.

wherein the FDY process comprises steps of metering, spinneret extruding, cooling, oiling, stretching, heat setting and winding;

wherein the technological parameters of the FDY process are chosen as follows: spinning temperature 280-290° C., cooling temperature 18-20° C., interlacing pressure 0.20-0.30 MPa, first godet roller speed 1800-2200 m/min, first godet roller temperature 75-90° C., second godet roller speed 3200-3400 m/min, second godet roller temperature 100-115° C., winding speed 3150-3360 m/min.

wherein the easy-to-dye degradable polyester FDY, the material is modified polyester;

wherein the modified polyester has a molecular chain structure composed of terephthalic acid segments, ethylene glycol segments, 2,2,3,4,5,5-hexamethyl-3,4-hexanediol segments and tert-butyl branched heptanediol segments;

wherein the modified polyester is also dispersed by solid heteropolyacid powder calcined at a high temperature.

The following preferred technology program is presented to give a detailed description: wherein the easy-to-dye degradable polyester FDY has the following performance indices as monofilament fineness 1.5-3.0 dtex, breaking strength ≥2.5 cN/dtex, elongation at break 40.0±2.0%, interlacing degree 15±2/m, linear density deviation rate ≤2.0%, breaking strength CV value ≤8.0%, breaking elongation CV value ≤8.0%, boiling water shrinkage rate 10.0±1.5%; the present invention introduces 2,2,3,4,5,5-hexamethyl-3,4-hexanediol, tert-butyl branched heptanediol, and solid heteropolyacid to modify the polyester, wherein the mechanical properties of the prepared fiber is not lower than that from the prior art.

wherein the easy-to-dye degradable polyester FDY has a dyeing performance as follows: dye uptake is 87.3-90.7% (at 125° C.), K/S value is 22.32-25.53, color fastness to soaping (polyester staining and cotton staining) reaches level 5, color fastness to dry crocking reaches level 5, and color fastness to wet crocking is higher than level 4; under the same conditions of Example 1, the contrast sample made of common polyester has the following performance indices: dye uptake is 86.8% (at 130° C.), K/S value is 22.08, color fastness to soaping is lower than level 5, polyester staining is level 4-5, cotton staining is level 4, color fastness to dry crocking is level 4-5, and color fastness to wet crocking is level 3-4;

wherein the easy-to-dye degradable polyester FDY has an intrinsic viscosity drop of 15-21% after a storage at 25° C. and R.H. 65% for 60 months, while the corresponding drop of the contrast sample is just 5%.

The mechanism of this invention could be described as follows.

The present invention introduces 2,2,3,4,5,5-hexamethyl-3,4-hexanediol, tert-butyl branched heptanediol, and solid heteropolyacid to modify the polyester, which greatly improves the dyeing performance and degradation rate of polyester FDY. The combination of 2,3,4,5,5-hexamethyl-3,4-hexanediol and the tert-butyl branched heptanediol modifying the polyester increases the free volume of the void of the modified polyester, which can reduce the difficulty of dye molecules penetrating into the modified polyester and improve the dyeing performance of the modified polyester. In addition, due to the modification of the polyester by the solid heteropolyacid, it can promote the nucleophilic addition reaction during the hydrolysis process, and significantly increase the degradation rate.

The mechanism of solid heteropolyacid increasing the degradation rate in the modification of polyester could be described as follows.

The hydrolysis of polyester is the reversal reaction of esterification, which essentially is the fracture process of acyl oxygen bond in ester group, that is the nucleophilic addition of nucleophilic reagent onto carbonyl group to form a tetrahedral intermediate and the elimination of an anion from it. The hydrolysis of common polyester is rather slow, and the main reason is that the ability of carbonyl carbon atom in polyester attacked by nucleophilic addition is very low, which is because the carbonyl carbon atoms in the polyester are surrounded by electron-donating groups, and lack electron-withdrawing groups, so that a strong nucleophilic group is needed to have a nucleophilic reaction with the carbonyl carbon atom in the polyester.

The present invention adds solid heteropolyacid into the polyester preparing material to significantly improve the ability of carbonyl carbon atom in polyester attacked by nucleophilic addition, thereby increasing the hydrolysis rate of the polyester. The solid heteropoly acid selected in the present invention is a kind of strong acidic polynuclear coordination acid catalyst composed of heteroatoms (central atoms) and metal atoms (coordinating atoms) bridged by oxygen atoms, and has strong high temperature resistance and catalytic resistance. Its catalytic function comes from the presence of catalytically active acidic sites on the solid surface. Because of its high temperature resistance, solid heteropolyacid can be added during polyester synthesis; since the esterification reaction of polyester is carried out under acidic conditions, acid can be used as the catalyst of polyester esterification, so the addition of solid heteropolyacid will not adversely affect the polymerization reaction, but only help the esterification reaction of terephthalic acid and ethylene glycol, lower the esterification reaction temperature and reduce side reaction of esterification process.

The terminal carboxyl group in the polyester system is the first position where the polyester hydrolysis occurs, and the unshared electron pair on the hydroxyl oxygen atom in the carboxyl group is conjugated with the $\pi$ electron of the carbonyl group, and the electron delocalization occurs, resulting in weakening of the hydrogen-oxygen bond force and dissociating the carboxylic acid into anions and protons. The carboxyl anion generated after the dissociation also distributes the negative charge of the carboxyl group evenly on the two oxygen atoms due to the delocalization of the electrons, which increases the stability of the carboxyl anion and is conducive to the dissociation of carboxylic acid into ions. The solid heteropolyacid can dissociate and produce $H^+$ ions, which can attack carboxyl anions to generate tetrahedral intermediates with positive ions, so that the carbonyl oxygen is protonated. It is positively charged to attract the electrons on the carbonyl carbon, making the carbonyl carbon have positive charge and easier to be attacked by nucleophilic reagent with weaker alkaline (such as $H_2O$). After the attack, the acyloxy group of the tetrahedral intermediate is broken and decomposed into acid and alcohol. In this cycle, the carbonyl group and the macromolecular chain are continuously destroyed, and the terminal carboxyl group content is continuously increased, which further promotes the hydrolysis of the polyester and increases the hydrolysis rate.

The mechanism of 2,2,3,4,5,5-hexamethyl-3,4-hexanediol and tert-butyl branched heptanediol increasing the dyeing performance in the modification of polyester could be described as follows.

The macromolecular chains in the polymer are not completely compact, between which are gaps called the free volume. In order for small molecules to penetrate into the polymers, there must be enough gaps in or between the polymers, so the permeability and the diffusibility of small molecules are related to the size of gaps in the polymer structure (that is, the size of the free volume). Within a certain range, if the size of the free volume gets larger, the permeability and the diffusibility of small molecules are better. The free volume is divided into the free volume of the void and the free volume of the slit. Compared to the free volume of the slit, the free volume of the void has a larger space size, and a more obvious effect on the improvement of the permeability of small molecules.

The steric hindrance, the size and the structure of the side group, and so on are main factors affecting the structure of the polymer, which is depended by the size and the type of free volume. When a certain position on the main chain of the polymer is substituted by a side group, it will inevitably cause changes in the mobility of the main chain, thereby changing the interaction force between chains, so does the distance between chains. It will lead to changes in cohesive energy and free volume, and has a certain impact on the rigidity of the molecular chain, the interaction between molecules and the free volume fraction of the polymer structure due to the polarity, size and length of the substituents on the side chain of the polymer. Therefore, different substituents have different effects, causing different permeation and separation properties of polymers.

For straight-chain glycol molecules such as ethylene glycol and butylene glycol, the carbon atoms on the main chain are arranged in a zigzag pattern on top of one another. When a hydrogen atom on a methylene group of main chain is replaced by a methyl group ($-CH_3$), the carbon atom on the side group and the carbon atom on the main chain are not in the same plane, so the four sp3 hybrid orbitals on the center carbon atom respectively overlap with the empty orbitals on the surrounding four carbon atoms, forming four identical σ bonds, which is arranged in a regular tetrahedron and the four carbon atoms are located at the four vertices of the regular tetrahedron. When the three hydrogens on a methyl group are further replaced by methyl groups, it is equivalent to tert-butyl substitution to form a larger tetrahedral structure. Compared to the molecular chain arranged in a zigzag pattern, the regular tetrahedral molecular chain has a significant increase in the free volume of the void, greatly improving the permeability and diffusibility of small molecules; when a hydrogen atom on a methylene group of main chain is replaced by a long-chain branched substituent, the main increase is in the free volume of the slit and the extent is small, slightly improving the permeability and diffusibility of small molecules, while the low rigidity of the long-chain branched substituent is not conducive to the increase of free volume due to the molecular chains are prone to entanglement.

The present invention introduces 2,2,3,4,5,5-hexamethyl-3,4-hexanediol and tert-butyl branched heptanediol into the molecular chain of the modified polyester to increase the dyeing performance of polyester FDY. The tert-butyl in 2,2,3,4,5,5-hexamethyl-3,4-hexanediol will cause changes in the mobility of the main chain, thereby changing the interaction force between chains, so does the distance between chains, resulting in an increase in the free volume of the void of the modified polyester. Compared to short-chain branched substituents (such as methyl, ethyl, etc.), tert-butyl occupies a larger space position and will obtain a larger free volume in the molecular chain arrangement; compared to long-chain branched substituents, on one hand, tert-butyl increases the free volume of the void, while long-chain branched substituents increase the free volume of the slit. On the other hand, the rigidity of tert-butyl is higher than the rigidity of long-chain branched substituents, reducing the entanglement between the molecular chains, so that the tert-butyl has more free volume than the long-chain branched substituents in the molecular chain arrangement. The introduction of 2,2,3,4,5,5-hexamethyl-3,4-hexanediol and tert-butyl branched heptanediol increases the free volume of the void of the modified polyester, making water or dye molecules easily penetrate into the macromolecule of modified polyester, drawing a positive impact on the dyeing of polyester fiber such as obtaining higher dye uptake with lower dyeing temperature, shorter dyeing time and less energy consumption.

In addition, 2,2,3,4,5,5-hexamethyl-3,4-hexanediol and tert-butyl branched heptanediol increases the free volume of the void, which is beneficial to penetrating water and improving the degradation efficiency of polyester with solid heteropolyacid.

Benefits:

(1) The method for preparing an easy-to-dye degradable polyester FDY modifies the polyester by adding solid heteropolyacid, which significantly improves the ability of carbonyl carbon atom in polyester attacked by nucleophilic addition, thereby increasing the hydrolysis rate of the polyester. Therefore, it can effectively solve the recycling of clothing in the field of clothing and weaving. It also modifies the polyester by introducing 2,2,3,4,5,5-hexamethyl-3,4-hexanediol and tert-butyl branched heptanediol to increase the free volume of the void and improve the dyeing performance of the polyester FDY;

(2) The method for preparing an easy-to-dye degradable polyester FDY has a simple process, a low cost, and a promising future;

(3) The easy-to-dye degradable polyester FDY of the invention has excellent dyeing performance and high degradation efficiency, with an intrinsic viscosity drop of 15-20% after a storage at 25° C. and R.H. 65% for 60 months.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, technicians in this field can make various changes or modifications to the invention, and these equivalent forms also fall within the scope of the claims attached to the application.

Example 1

A method for preparing an easy-to-dye degradable polyester FDY, comprising the steps:

(1) Preparation of Modified Polyester;

(1.1) Preparation of Solid Heteropolyacid $SiO_2$—$TiO_2$ Powder;

adding 1 part of $SiO_2$ powder into 55 parts of water and stirring to disperse, then dripping in 2 parts of titanyl sulfate solution with a concentration of 4.5 wt %, adjusting the pH value firstly to neutral with 1.0 mol/L sodium hydroxide solution and then to 8 with 10 wt % sulfuric acid successively, after aging for 2 h, washing the solution with deionized water until no $SO_4^{2-}$ detection then suction, further washing the filter cake with anhydrous ethanol for several times and then drying it at 100° C., finally calcining the sample at 500° C. for 2 h and crushing to obtain solid heteropolyacid $SiO_2$—$TiO_2$ powder with an average size of 0.4 μm and a $TiO_2$ content of 42 wt %;

(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 10% mass concentration of hydrogen peroxide solution and reacting at 72° C. for 3 h, wherein the mass ratio of di-tert-butyl dimethyl ethylene, hydrogen peroxide solution and palladium acetate is 1:2.0:0.015, and the structural formula of 2,2,3,4,5,5-hexamethyl-3,4-hexanediol is shown in Formula (I);

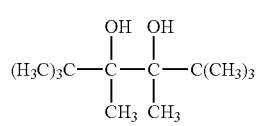

Formula (I)

(1.3) Synthesizing 2,6,6-trimethyl-2,5-heptanediol (a) mixing isobutanol and 43% of KOH aqueous solution in the molar ratio of isobutanol to KOH as 5:1, then carrying out the reaction with a stirring at 100° C. for 4 h to obtain potassium isobutanol;

(b) removing the impurities from the system in step (a) and down to room temperature, then adding in xylene in the molar ratio of potassium isobutanol to xylene as 1.3:2.2 and cooling to 1° C.;

(c) adding 3-methyl-3-hydroxybutyne and 2,2-dimethyl-propionaldehyde into the system of step (b) in a molar ratio of 3-methyl-3-hydroxybutyne:2,2-dimethylpropionaldehyde:xylene as 1:1.2:2.2, then starting the reaction at 25° C. for 3 h, and obtaining octyne diol after a series of processes of cooling crystallization, centrifugation and drying;

(d) mixing octyne diol, ethanol and palladium catalyst in a weight ratio of 2.2:10:0.01 and then carrying out the reaction accompanied with a continuous hydrogen input at 50° C. for 50 min, finally obtaining 2,6,6-trimethyl-2,5-heptanediol (just as demonstrated in Formula (II) with R=—H) through a series of processes of separation and purification;

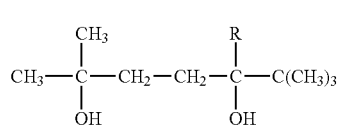

Formula (II)

(1.4) Esterification concocting terephthalic acid, ethylene glycol, 2,2,3,4,5,5-hexamethyl-3,4-hexanediol and 2,6,6-trimethyl-2,5-heptanediol to a slurry (in which the molar ration of terephthalic acid and ethylene glycol is 1:1.2, the total addition of 2,2,3,4,5,5-hexamethyl-3,4-hexanediol and 2,6,6-trimethyl-2,5-heptanediol with a molar ratio of 2:3 is 3 mol % relative to the amount of terephthalic acid), and adding in 0.03 wt % of solid heteropolyacid $SiO_2$—$TiO_2$ powder, 0.03 wt % of antimony trioxide, 0.20 wt % of titanium dioxide and 0.01 wt % of triphenyl phosphate (all are relative to the amount of terephthalic acid), then carrying out the esterification under a 0.3 MPa of nitrogen pressure at 250° C., finally ending the reaction when the water distillation rate reaches 90.1% of the theoretical value;

(1.5) Polycondensation after smoothly reducing the pressure from normal value to 400 Pa within 50 min, conducting the low vacuum polycondensation for the esterification products at 260° C. for 50 min, then further reducing the pressure to 80 Pa and continuing the high vacuum polycondensation at 282° C. for 90 min, finally obtaining the modified polyester with a molecular weight of 18500 Da and a molecular weight distribution index of 2.4;

(2) Preparing the modified polyester FDY, that is the easy-to-dye degradable polyester FDY from the modified polyester melt with FDY process including stages of metering, spinneret extruding (at 290° C.), cooling (at 20° C.), oiling, stretching as well as heat setting (carried on with the parameters of interlacing pressure 0.30 MPa, first godet roller speed 2200 m/min, first godet roller temperature 90° C., second godet roller speed 3400 m/min, second godet roller temperature 115° C.), and winding (3360 m/min).

The prepared easy-to-dye degradable polyester FDY has the performance indices of monofilament fineness 3.0 dtex, breaking strength 2.7 cN/dtex, elongation at break 42.0%, interlacing degree 17/m, linear density deviation rate 2.0%, breaking strength CV value 8.0%, breaking elongation CV value 8.0%, boiling water shrinkage rate 11.5%; wherein the dye uptake rate is 87.3% (at 125° C.), K/S value is 22.32, color fastness to soaping reaches level 5, color fastness to dry crocking reaches level 5, and color fastness to wet crocking is level 4-5; wherein the intrinsic viscosity drops 15% after a storage at 25° C. and R.H. 65% for 60 months.

Comparison 1

A method for preparing polyester FDY comprises steps basically the same as those in Example 1, except for the heteropolyacid $SiO_2$—$TiO_2$ powder, the 2,2,3,4,5,5-hexamethyl-3,4-hexanediol and the 2,6,6-trimethyl-2,5-heptanediol are not added. The polyester FDY has the performance indices of monofilament fineness 3.0 dtex, breaking strength 2.8 cN/dtex, elongation at break 41.0%, interlacing degree 17/m, linear density deviation rate 1.9%, breaking strength CV value 8.0%, breaking elongation CV value 7.6%, boiling water shrinkage rate 10.5%; under the same conditions as the other tests in Example 1, wherein the dye uptake rate is 85.23% (at 125° C.), K/S value is 21.08, color fastness to soaping reaches level 5, color fastness to dry crocking reaches level 4, and color fastness to wet crocking reaches level 4; wherein the intrinsic viscosity drops 3.2% after a storage at 25° C. and R.H. 65% for 60 months.

Comparison 2

A method for preparing polyester FDY comprises steps basically the same as those in Example 1, except for the heteropolyacid $SiO_2$—$TiO_2$ powder is not added. The polyester FDY has the performance indices of monofilament fineness 3.0 dtex, breaking strength 2.8 cN/dtex, elongation at break 42.0%, interlacing degree 17/m, linear density deviation rate 1.8%, breaking strength CV value 7.7%, breaking elongation CV value 7.5%, boiling water shrinkage rate 11.2%; under the same conditions as the other tests in Example 1, wherein the dye uptake rate is 87.2% (at 125° C.), K/S value is 22.41, color fastness to soaping reaches level 5, color fastness to dry crocking reaches level 5, and color fastness to wet crocking reaches level 4; wherein the intrinsic viscosity drops 4.8% after a storage at 25° C. and R.H. 65% for 60 months.

Comparison 3

A method for preparing polyester FDY comprises steps basically the same as those in Example 1, except for the 2,2,3,4,5,5-hexamethyl-3,4-hexanediol is not added. The polyester FDY has the performance indices of monofilament fineness 3.0 dtex, breaking strength 2.5 cN/dtex, elongation at break 41.0%, interlacing degree 17/m, linear density deviation rate 2.0%, breaking strength CV value 7.7%, breaking elongation CV value 8.0%, boiling water shrinkage rate 11.0%; under the same conditions as the other tests in Example 1, wherein the dye uptake rate is 86.5% (at 125° C.), K/S value is 22.01, color fastness to soaping reaches level 5, color fastness to dry crocking reaches level 4, and color fastness to wet crocking reaches level 4; wherein the intrinsic viscosity drops 12% after a storage at 25° C. and R.H. 65% for 60 months.

Comparison 4

A method for preparing polyester FDY comprises steps basically the same as those in Example 1, except for the 2,6,6-trimethyl-2,5-heptanediol is not added. The polyester FDY has the performance indices of monofilament fineness 3.0 dtex, breaking strength 2.6 cN/dtex, elongation at break 40.0%, interlacing degree 17/m, linear density deviation rate 1.8%, breaking strength CV value 7.8%, breaking elongation CV value 7.9%, boiling water shrinkage rate 10.8%; under the same conditions as the other tests in Example 1, wherein the dye uptake rate is 86.3% (at 125° C.), K/S value is 21.89, color fastness to soaping reaches level 5, color fastness to dry crocking reaches level 5, and color fastness to wet crocking reaches level 4; wherein the intrinsic viscosity drops 13% after a storage at 25° C. and R.H. 65% for 60 months.

Comparing Example 1 and Comparisons 1-3, it is shown that adding the heteropolyacid $SiO_2$—$TiO_2$ powder, the 2,2,3,4,5,5-hexamethyl-3,4-hexanediol and the 2,6,6-trimethyl-2,5-heptanediol significantly improves degradation and dyeing performances of the fiber through cooperation. The 2,2,3,4,5,5-hexamethyl-3,4-hexanediol and the 2,6,6-trimethyl-2,5-heptanediol increase the free volume of the void of the polyester, which is beneficial to penetrating oxygen and water, and improving the degradation efficiency of polyester with solid heteropolyacid. Furthermore, the addition of heteropolyacid $SiO_2$—$TiO_2$ powder, 2,2,3,4,5,5-hexamethyl-3,4-hexanediol and 2,6,6-trimethyl-2,5-heptanediol has little effect on other performances of the fiber, especially not affecting its production and mechanical properties Comparison 5

A method for preparing polyester FDY comprises steps basically the same as those in Example 1, except for the 2,6,6-trimethyl-2,5-heptanediol is replaced by 1,2-dodecyldiol. The polyester FDY has the performance indices of monofilament fineness 3.0 dtex, breaking strength 2.7 cN/dtex, elongation at break 40.6%, interlacing degree 17/m, linear density deviation rate 2.0%, breaking strength CV value 7.7%, breaking elongation CV value 8.0%, boiling water shrinkage rate 11.0%; under the same conditions as the other tests in Example 1, wherein the dye uptake rate is 86.8% (at 125° C.), K/S value is 22.01, color fastness to soaping reaches level 5, color fastness to dry crocking reaches level 4, and color fastness to wet crocking reaches level 4; wherein the intrinsic viscosity drops 12% after a storage at 25° C. and R.H. 65% for 60 months.

Compared to Example 1, the tert-butyl branched glycol is more beneficial to improving dyeing performance of the fiber than 1,2-dodecyldiol. This is because on one hand, the tert-butyl increases the free volume of the void, while long-chain branched substituents increase the free volume of the slit. On the other hand, the rigidity of the tert-butyl is higher than the rigidity of long-chain branched substituents, reducing the entanglement between the molecular chains, so the tert-butyl branched glycol has more free volume than the 1,2-dodecyldiol containing long-chain branched substituents in the molecular chain arrangement, which is more beneficial to improving dyeing performance of the fiber. In addition, the increase in the free volume of the void reduces the difficulties of macromolecule such as air and water penetrating into the polyester, significantly improving the degradation efficiency.

Comparison 6

A method for preparing polyester FDY comprises steps basically the same as those in Example 1, except for the 2,2,3,4,5,5-hexamethyl-3,4-hexanediol is replaced by 1,2-dodecyldiol. The polyester FDY has the performance indices of monofilament fineness 3.0 dtex, breaking strength 2.5 cN/dtex, elongation at break 41.0%, interlacing degree 17/m, linear density deviation rate 2.0%, breaking strength CV value 7.7%, breaking elongation CV value 8.0%, boiling water shrinkage rate 11.0%; under the same conditions as the other tests in Example 1, wherein the dye uptake rate is 86.3% (at 125° C.), K/S value is 22.17, color fastness to soaping reaches level 5, color fastness to dry crocking reaches level 4, and color fastness to wet crocking reaches level 4; wherein the intrinsic viscosity drops 11.6% after a storage at 25° C. and R.H. 65% for 60 months.

Compared to Example 1, the tert-butyl of 2,2,3,4,5,5-hexamethyl-3,4-hexanediol is more beneficial to improving dyeing performance of the fiber than the long-chain branched substituents of 1,2-dodecyldiol. This is because on one hand, the tert-butyl of 2,2,3,4,5,5-hexamethyl-3,4-hexanediol increases the free volume of the void, while long-chain branched substituents of 1,2-dodecyldiol increase the free volume of the slit. On the other hand, the rigidity of the said tert-butyl is higher than the rigidity of the said long-chain branched substituents, reducing the entanglement between the molecular chains, so the 2,2,3,4,5,5-hexamethyl-3,4-hexanediol has more free volume than the 1,2-dodecyldiol in the molecular chain arrangement, which is more beneficial to improving dyeing performance of the fiber. In addition, the increase in the free volume of the void reduces the difficulties of macromolecule such as air and water penetrating into the polyester, significantly improving the degradation efficiency.

Example 2

A method for preparing an easy-to-dye degradable polyester FDY, comprising the steps:
(1) Preparation of Modified Polyester;
(1.1) Preparation of Solid Heteropolyacid $SiO_2$—$ZrO_2$ Powder;
  adding 1 part of $SiO_2$ powder into 58 parts of water and stirring to disperse, then dripping in 2 parts of zirconium sulfate solution with a concentration of 5 wt %, adjusting the pH value firstly to neutral with 1.0 mol/L sodium hydroxide solution and then to 8 with 10 wt % sulfuric acid successively, after aging for 1 h, washing the solution with deionized water until no $SO_4^{2-}$ detection then suction, further washing the filter cake with anhydrous ethanol for several times and then drying it at 100° C., finally calcining the sample at 400° C. for 4 h and crushing to obtain solid heteropolyacid $SiO_2$—$ZrO_2$ powder with an average size of 0.45 μm and a $ZrO_2$ content of 45 wt %;
(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 11% mass concentration of hydrogen peroxide solution and reacting at 72° C. for 4 h, wherein the mass ratio of di-tert-butyl dimethyl ethylene, hydrogen peroxide solution and palladium acetate is 1:1.8:0.015, and the structural formula of 2,2,3,4,5,5-hexamethyl-3,4-hexanediol is shown in Formula (I);
(1.3) Synthesizing 2,6,6-trimethyl-2,5-heptanediol
  (a) mixing isobutanol and 40% of KOH aqueous solution in the molar ratio of isobutanol to KOH as 5.5:1, then carrying out the reaction with a stirring at 100° C. for 5 h to obtain potassium isobutanol;
  (b) removing the impurities from the system in step (a) and down to room temperature, then adding in xylene in the molar ratio of potassium isobutanol to xylene as 1.3:2.0 and cooling to 3° C.;
  (c) adding 3-methyl-3-hydroxybutyne and 2,2-dimethylpropionaldehyde into the system of step (b) in a molar ratio of 3-methyl-3-hydroxybutyne:2,2-dimethylpropionaldehyde:xylene as 1:1.3:2.5, then starting the reaction at 30° C. for 3 h, and obtaining octyne diol after a series of processes of cooling crystallization, centrifugation and drying;
  (d) mixing octyne diol, ethanol and palladium catalyst in a weight ratio of 2.5:10:0.01 and then carrying out the reaction accompanied with a continuous hydrogen input at 50° C. for 55 min, finally obtaining 2,6,6-trimethyl-2,5-heptanediol (just as demonstrated in Formula (II) with R=—H) through a series of processes of separation and purification;
(1.4) Esterification
  concocting terephthalic acid, ethylene glycol, 2,2,3,4,5,5-hexamethyl-3,4-hexanediol and 2,6,6-trimethyl-2,5-heptanediol into a slurry (in which the molar ration of terephthalic acid and ethylene glycol is 1:2.0, the total addition of 2,2,3,4,5,5-hexamethyl-3,4-hexanediol and 2,6,6-trimethyl-2,5-heptanediol with a molar ratio of 3:5 is 5 mol % relative to the amount of terephthalic acid), and adding in 0.05 wt % of solid heteropolyacid $SiO_2$—$ZrO_2$ powder, 0.05 wt % of antimony glycol, 0.25 wt % of titanium dioxide and 0.05 wt % of trimethyl phosphate (all are relative to the amount of terephthalic acid), then carrying out the esterification under an atmospheric pressure of nitrogen pressure at 260° C., finally ending the reaction when the water distillation rate reaches 99% of the theoretical value;
(1.5) Polycondensation
  after smoothly reducing the pressure from normal value to 499 Pa within 30 min, conducting the low vacuum polycondensation for the esterification products at 250° C. for 30 min, then further reducing the pressure to 99 Pa and continuing the high vacuum polycondensation at 270° C. for 50 min, finally obtaining the modified polyester with a molecular weight of 17000 Da and a molecular weight distribution index of 2.0;
(2) Preparing the modified polyester FDY, that is the easy-to-dye degradable polyester FDY from the modified polyester melt with FDY process including stages of metering, spinneret extruding (at 280° C.), cooling (at 18° C.), oiling, stretching as well as heat setting (carried on with the parameters of interlacing pressure 0.20 MPa, first godet roller speed 1800 m/min, first godet roller temperature 75° C., second godet roller speed 3200 m/min, second godet roller temperature 100° C.), and winding (3150 m/min).

The prepared easy-to-dye degradable polyester FDY has the performance indices of monofilament fineness 1.5 dtex, breaking strength 2.5 cN/dtex, elongation at break 38.0%, interlacing degree 13/m, linear density deviation rate 1.6%, breaking strength CV value 6.4%, breaking elongation CV value 6.4%, boiling water shrinkage rate 8.9%; wherein the dye uptake rate is 90.7% (at 125° C.), K/S value is 25.53, color fastness to soaping reaches level 5, color fastness to dry crocking reaches level 5, and color fastness to wet crocking reaches level 5; wherein the intrinsic viscosity drops 21% after a storage at 25° C. and R.H. 65% for 60 months.

Example 3

A method for preparing an easy-to-dye degradable polyester FDY, comprising the steps:
(1) Preparation of Modified Polyester;
(1.1) Preparation of Solid Heteropolyacid $B_2O_3$-$Al_2O_3$ Powder;
  dripping in 1 part of boric acid into 2.5 parts of aluminum sulfate solution with a concentration of 4.5 wt %, adjusting the pH value firstly to neutral with 1.0 mol/L sodium hydroxide solution and then to 8 with 9 wt % sulfuric acid successively, after aging for 1.5 h, washing the solution with deionized water until no $SO_4^{2-}$ detection then suction, further washing the filter cake with anhydrous ethanol for several times and then drying it at 100° C., finally calcining the sample at 700° C. for 2 h and crushing to obtain solid heteropolyacid $B_2O_3$—$Al_2O_3$ powder with an average size of 0.48 μm and a $Al_2O_3$ content of 30 wt %;
(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 12% mass concentration of hydrogen peroxide solution and reacting at 74° C. for 4 h, wherein the mass ratio of di-tert-butyl dimethyl ethylene, hydrogen peroxide solution and palladium acetate is 1:1.6:0.015, and the structural formula of 2,2,3,4,5,5-hexamethyl-3,4-hexanediol is shown in Formula (I);
(1.3) Synthesizing 2,6,6-trimethyl-5-ethyl-2,5-heptanediol
  (a) mixing isobutanol and 48% of KOH aqueous solution in the molar ratio of isobutanol to KOH as 5:1, then carrying out the reaction with a stirring at 105° C. for 4.5 h to obtain potassium isobutanol;

(b) removing the impurities from the system in step (a) and down to room temperature, then adding in xylene in the molar ratio of potassium isobutanol to xylene as 1.5:2.5 and cooling to 0° C.;

(c) adding 3-methyl-3-hydroxybutyne and 2,2-dimethyl-3-pentanone into the system of step (b) in a molar ratio of 3-methyl-3-hydroxybutyne:2,2-dimethyl-3-pentanone:xylene as 1:1.25:2.0, then starting the reaction at 30° C. for 3 h, and obtaining octyne diol after a series of processes of cooling crystallization, centrifugation and drying;

(d) mixing octyne diol, ethanol and palladium catalyst in a weight ratio of 2:10:0.02 and then carrying out the reaction accompanied with a continuous hydrogen input at 42° C. for 60 min, finally obtaining 2,6,6-trimethyl-5-ethyl-2,5-heptanediol (just as demonstrated in Formula (II) with R=—CH$_2$CH$_3$) through a series of processes of separation and purification;

(1.4) Esterification concocting terephthalic acid, ethylene glycol, 2,2,3,4,5,5-hexamethyl-3,4-hexanediol and 2,6,6-trimethyl-5-ethyl-2,5-heptanediol into a slurry (in which the molar ration of terephthalic acid and ethylene glycol is 1:1.6, the total addition of 2,2,3,4,5,5-hexamethyl-3,4-hexanediol and 2,6,6-trimethyl-5-ethyl-2,5-heptanediol with a molar ratio of 2.5:4 is 4 mol % relative to the amount of terephthalic acid), and adding in 0.04 wt % of solid heteropolyacid B$_2$O$_3$—Al$_2$O$_3$ powder, 0.04 wt % of antimony acetate, 0.22 wt % of titanium dioxide and 0.03 wt % of trimethyl phosphite (all are relative to the amount of terephthalic acid), then carrying out the esterification under a 0.2 MPa of nitrogen pressure at 255° C., finally ending the reaction when the water distillation rate reaches 95% of the theoretical value;

(1.5) Polycondensation after smoothly reducing the pressure from normal value to 450 Pa within 40 min, conducting the low vacuum polycondensation for the esterification products at 255° C. for 40 min, then further reducing the pressure to 90 Pa and continuing the high vacuum polycondensation at 275° C. for 70 min, finally obtaining the modified polyester with a molecular weight of 18000 Da and a molecular weight distribution index of 2.2;

(2) Preparing the modified polyester FDY, that is the easy-to-dye degradable polyester FDY from the modified polyester melt with FDY process including stages of metering, spinneret extruding (at 285° C.), cooling (at 19° C.), oiling, stretching as well as heat setting (carried on with the parameters of interlacing pressure 0.250 MPa, first godet roller speed 2000 m/min, first godet roller temperature 80° C., second godet roller speed 3300 m/min, second godet roller temperature 108° C.), and winding (3250 m/min).

The prepared easy-to-dye degradable polyester FDY has the performance indices of monofilament fineness 2.3 dtex, breaking strength 2.6 cN/dtex, elongation at break 40.0%, interlacing degree 15/m, linear density deviation rate 1.7%, breaking strength CV value 7.1%, breaking elongation CV value 7.3%, boiling water shrinkage rate 8.5%; wherein the dye uptake rate is 88.9% (at 125° C.), K/S value is 23.83, color fastness to soaping reaches level 5, color fastness to dry crocking reaches level 5, and color fastness to wet crocking reaches level 5; wherein the intrinsic viscosity drops 18% after a storage at 25° C. and R.H. 65% for 60 months.

Example 4

A method for preparing an easy-to-dye degradable polyester FDY, comprising the steps:

(1) Preparation of Modified Polyester;

(1.1) Preparation of Solid Heteropolyacid TiO$_2$—ZnO Powder;

dripping in 1 part of zinc sulfate into 3 parts of titanyl sulfate solution with a concentration of 5 wt %, adjusting the pH value firstly to neutral with 1.0 mol/L sodium hydroxide solution and then to 8 with 10 wt % sulfuric acid successively, after aging for 2 h, washing the solution with deionized water until no SO$_4^{2-}$ detection then suction, further washing the filter cake with anhydrous ethanol for several times and then drying it at 100° C., finally calcining the sample at 600° C. for 2.5 h and crushing to obtain solid heteropolyacid TiO$_2$—ZnO powder with an average size of 0.45 μm and a ZnO content of 35 wt %;

(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 13% mass concentration of hydrogen peroxide solution and reacting at 74° C. for 3.5 h, wherein the mass ratio of di-tert-butyl dimethyl ethylene, hydrogen peroxide solution and palladium acetate is 1:1.5:0.015, and the structural formula of 2,2,3,4,5,5-hexamethyl-3,4-hexanediol is shown in Formula (I);

(1.3) Synthesizing 2,6,6-trimethyl-5-ethyl-2,5-heptanediol (a) mixing isobutanol and 41% of KOH aqueous solution in the molar ratio of isobutanol to KOH as 6:1, then carrying out the reaction with a stirring at 110° C. for 4.8 h to obtain potassium isobutanol;

(b) removing the impurities from the system in step (a) and down to room temperature, then adding in xylene in the molar ratio of potassium isobutanol to xylene as 1.4:3.0 and cooling to 0° C.;

(c) adding 3-methyl-3-hydroxybutyne and 2,2-dimethyl-3-pentanone into the system of step (b) in a molar ratio of 3-methyl-3-hydroxybutyne:2,2-dimethyl-3-pentanone:xylene as 1:1.3:2.6, then starting the reaction at 35° C. for 3 h, and obtaining octyne diol after a series of processes of cooling crystallization, centrifugation and drying;

(d) mixing octyne diol, ethanol and palladium catalyst in a weight ratio of 3:10:0.01 and then carrying out the reaction accompanied with a continuous hydrogen input at 40° C. for 60 min, finally obtaining 2,6,6-trimethyl-5-ethyl-2,5-heptanediol (just as demonstrated in Formula (II) with R=—CH$_2$CH$_3$) through a series of processes of separation and purification;

(1.4) Esterification concocting terephthalic acid, ethylene glycol, 2,2,3,4,5,5-hexamethyl-3,4-hexanediol and 2,6,6-trimethyl-5-ethyl-2,5-heptanediol into a slurry (in which the molar ration of terephthalic acid and ethylene glycol is 1:1.8, the total addition of 2,2,3,4,5,5-hexamethyl-3,4-hexanediol and 2,6,6-trimethyl-5-ethyl-2,5-heptanediol with a molar ratio of 2:5 is 3 mol % relative to the amount of terephthalic acid), and adding in 0.05 wt % of solid heteropolyacid TiO$_2$—ZnO powder, 0.05 wt % of antimony glycol, 0.25 wt % of titanium dioxide and 0.01 wt % of triphenyl phosphite (all are relative to the amount of terephthalic acid), then carrying out the esterification under a 0.25 MPa of nitrogen pressure at 260° C., finally ending the reaction when the water distillation rate reaches 94% of the theoretical value;

(1.5) Polycondensation after smoothly reducing the pressure from normal value to 450 Pa within 50 min, conducting the low vacuum polycondensation for the esterification products at 255° C. for 50 min, then further reducing the pressure to 85 Pa and continuing the high vacuum polycondensation at 280° C. for 90 min, finally obtaining the modified polyester with a molecular weight of 19000 Da and a molecular weight distribution index of 2.1;

(2) Preparing the modified polyester FDY, that is the easy-to-dye degradable polyester FDY from the modified polyester melt with FDY process including stages of metering, spinneret extruding (at 280° C.), cooling (at 18° C.), oiling, stretching as well as heat setting (carried on with the parameters of interlacing pressure 0.20 MPa, first godet roller speed 1800 m/min, first godet roller temperature 75° C., second godet roller speed 3400 m/min, second godet roller temperature 100° C.), and winding (3360 m/min).

The prepared easy-to-dye degradable polyester FDY has the performance indices of monofilament fineness 1.9 dtex, breaking strength 2.5 cN/dtex, elongation at break 41.0%, interlacing degree 16/m, linear density deviation rate 1.6%, breaking strength CV value 6.8%, breaking elongation CV value 6.9%, boiling water shrinkage rate 9.0%; wherein the dye uptake rate is 87.7% (at 125° C.), K/S value is 22.52, color fastness to soaping reaches level 5, color fastness to dry crocking reaches level 5, and color fastness to wet crocking is level 4-5; wherein the intrinsic viscosity drops 16% after a storage at 25° C. and R.H. 65% for 60 months.

Example 5

A method for preparing an easy-to-dye degradable polyester FDY, comprising the steps:

(1) Preparation of Modified Polyester;

(1.1) Preparation of Solid Heteropolyacid $SiO_2$—CaO Powder;

adding 1 part of $SiO_2$ powder into 50 parts of water and stirring to disperse, then dripping in 3 parts of calcium sulfate solution with a concentration of 5 wt %, adjusting the pH value firstly to neutral with 1.0 mol/L sodium hydroxide solution and then to 8 with 10 wt % sulfuric acid successively, after aging for 2 h, washing the solution with deionized water until no $SO_4^{2-}$ detection then suction, further washing the filter cake with anhydrous ethanol for several times and then drying it at 100° C., finally calcining the sample at 650° C. for 3.5 h and crushing to obtain solid heteropolyacid $SiO_2$—CaO powder with an average size of 0.45 μm and a CaO content of 45 wt %;

(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 14% mass concentration of hydrogen peroxide solution and reacting at 71° C. for 3.5 h, wherein the mass ratio of di-tert-butyl dimethyl ethylene, hydrogen peroxide solution and palladium acetate is 1:1.7:0.015, and the structural formula of 2,2,3,4,5,5-hexamethyl-3,4-hexanediol is shown in Formula (I);

(1.3) Synthesizing 2,6,6-trimethyl-5-isopropyl-2,5-heptanediol (a) mixing isobutanol and 50% of KOH aqueous solution in the molar ratio of isobutanol to KOH as 5.4:1, then carrying out the reaction with a stirring at 110° C. for 5 h to obtain potassium isobutanol;

(b) removing the impurities from the system in step (a) and down to room temperature, then adding in xylene in the molar ratio of potassium isobutanol to xylene as 1.4:2.6 and cooling to 4° C.;

(c) adding 3-methyl-3-hydroxybutyne and 2,2,4-trimethyl-3-pentanone into the system of step (b) in a molar ratio of 3-methyl-3-hydroxybutyne:2,2,4-trimethyl-3-pentanone:xylene as 1:1.2:3.0, then starting the reaction at 28° C. for 3 h, and obtaining octyne diol after a series of processes of cooling crystallization, centrifugation and drying;

(d) mixing octyne diol, ethanol and palladium catalyst in a weight ratio of 2.5:10:0.03 and then carrying out the reaction accompanied with a continuous hydrogen input at 44° C. for 53 min, finally obtaining 2,6,6-trimethyl-5-isopropyl-2,5-heptanediol (just as demonstrated in Formula (II) with R=—$CH(CH_3)_2$) through a series of processes of separation and purification;

(1.4) Esterification concocting terephthalic acid, ethylene glycol, 2,2,3,4,5,5-hexamethyl-3,4-hexanediol and 2,6,6-trimethyl-5-isopropyl-2,5-heptanediol into a slurry (in which the molar ration of terephthalic acid and ethylene glycol is 1:1.6, the total addition of 2,2,3,4,5,5-hexamethyl-3,4-hexanediol and 2,6,6-trimethyl-5-isopropyl-2,5-heptanediol with a molar ratio of 3:3 is 4 mol % relative to the amount of terephthalic acid), and adding in 0.03 wt % of solid heteropolyacid $SiO_2$—CaO powder, 0.03 wt % of antimony trioxide, 0.25 wt % of titanium dioxide and 0.05 wt % of trimethyl phosphate (all are relative to the amount of terephthalic acid), then carrying out the esterification under a 0.15 MPa of nitrogen pressure at 260° C., finally ending the reaction when the water distillation rate reaches 92% of the theoretical value;

(1.5) Polycondensation after smoothly reducing the pressure from normal value to 420 Pa within 40 min, conducting the low vacuum polycondensation for the esterification products at 250° C. for 50 min, then further reducing the pressure to 90 Pa and continuing the high vacuum polycondensation at 282° C. for 90 min, finally obtaining the modified polyester with a molecular weight of 18600 Da and a molecular weight distribution index of 2.0;

(2) Preparing the modified polyester FDY, that is the easy-to-dye degradable polyester FDY from the modified polyester melt with FDY process including stages of metering, spinneret extruding (at 280° C.), cooling (at 18° C.), oiling, stretching as well as heat setting (carried on with the parameters of interlacing pressure 0.30 MPa, first godet roller speed 2200 m/min, first godet roller temperature 75° C., second godet roller speed 3200 m/min, second godet roller temperature 115° C.), and winding (3150 m/min).

The prepared easy-to-dye degradable polyester FDY has the performance indices of monofilament fineness 2.4 dtex, breaking strength 2.5 cN/dtex, elongation at break 40.1%, interlacing degree 14/m, linear density deviation rate 1.8%, breaking strength CV value 7.3%, breaking elongation CV value 6.9%, boiling water shrinkage rate 10.0%; wherein the dye uptake rate is 88.3% (at 125° C.), K/S value is 23.72, color fastness to soaping reaches level 5, color fastness to dry crocking reaches level 5, and color fastness to wet crocking reaches level 5; wherein the intrinsic viscosity drops 17% after a storage at 25° C. and R.H. 65% for 60 months.

Example 6

A method for preparing an easy-to-dye degradable polyester FDY, comprising the steps:

(1) Preparation of Modified Polyester;

(1.1) Preparation of Solid Heteropolyacid Powder;

mixing $SiO_2$—$TiO_2$ powder and $SiO_2$—$ZrO_2$ powder both with an average particle size of 0.45 μm at a mass ratio of 1:1. Among them, the content of $TiO_2$ and $ZrO_2$ is 30 wt % and 50 wt %, respectively. The preparation methods of $SiO_2$—$TiO_2$ powder and $SiO_2$—$ZrO_2$ powder are basically the same as those in Examples 1 and 2, except for the degree of pulverization and the amount of materials added;

(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 15% mass concentration of hydrogen peroxide solution and reacting at 75° C. for 3 h, wherein the mass ratio of di-tert-butyl dimethyl ethylene, hydrogen peroxide solution and palladium acetate is 1:1.9:0.015, and the structural formula of 2,2,3,4,5,5-hexamethyl-3,4-hexanediol is shown in Formula (I); (1.3) Synthesizing 2,6,6-trimethyl-5-isopropyl-2,5-heptanediol (a) mixing isobutanol and 40% of KOH aqueous solution in the molar ratio of isobutanol to KOH as 5:1, then carrying out the reaction with a stirring at 106° C. for 4.5 h to obtain potassium isobutanol;

(b) removing the impurities from the system in step (a) and down to room temperature, then adding in xylene in the molar ratio of potassium isobutanol to xylene as 1.3:2.0 and cooling to 2° C.;

(c) adding 3-methyl-3-hydroxybutyne and 2,2,4-trimethyl-3-pentanone into the system of step (b) in a molar ratio of 3-methyl-3-hydroxybutyne:2,2,4-trimethyl-3-pentanone:xylene as 1:1.3:2.5, then starting the reaction at 32° C. for 3 h, and obtaining octyne diol after a series of processes of cooling crystallization, centrifugation and drying;

(d) mixing octyne diol, ethanol and palladium catalyst in a weight ratio of 2:10:0.01 and then carrying out the reaction accompanied with a continuous hydrogen input at 48° C. for 50 min, finally obtaining 2,6,6-trimethyl-5-isopropyl-2,5-heptanediol (just as demonstrated in Formula (II) with R=—$CH(CH_3)_2$) through a series of processes of separation and purification;

(1.4) Esterification concocting terephthalic acid, ethylene glycol, 2,2,3,4,5,5-hexamethyl-3,4-hexanediol and 2,6,6-trimethyl-5-isopropyl-2,5-heptanediol into a slurry (in which the molar ration of terephthalic acid and ethylene glycol is 1:1.2, the total addition of 2,2,3,4,5,5-hexamethyl-3,4-hexanediol and 2,6,6-trimethyl-5-isopropyl-2,5-heptanediol with a molar ratio of 2:3 is 3 mol % relative to the amount of terephthalic acid), and adding in 0.04 wt % of solid heteropolyacid powder, 0.03 wt % of antimony acetate, 0.25 wt % of titanium dioxide and 0.02 wt % of triphenyl phosphate (all are relative to the amount of terephthalic acid), then carrying out the esterification under a 0.2 MPa of nitrogen pressure at 250° C., finally ending the reaction when the water distillation rate reaches 94% of the theoretical value;

(1.5) Polycondensation after smoothly reducing the pressure from normal value to 400 Pa within 50 min, conducting the low vacuum polycondensation for the esterification products at 260° C. for 40 min, then further reducing the pressure to 80 Pa and continuing the high vacuum polycondensation at 2705° C. for 80 min, finally obtaining the modified polyester with a molecular weight of 17900 Da and a molecular weight distribution index of 2.1;

(2) Preparing the modified polyester FDY, that is the easy-to-dye degradable polyester FDY from the modified polyester melt with FDY process including stages of metering, spinneret extruding (at 280° C.), cooling (at 20° C.), oiling, stretching as well as heat setting (carried on with the parameters of interlacing pressure 0.20 MPa, first godet roller speed 2200 m/min, first godet roller temperature 90° C., second godet roller speed 3200 m/min, second godet roller temperature 115° C.), and winding (3150 m/min).

The prepared easy-to-dye degradable polyester FDY has the performance indices of monofilament fineness 2.5 dtex, breaking strength 2.5 cN/dtex, elongation at break 41.0%, interlacing degree 15/m, linear density deviation rate 1.8%, breaking strength CV value 6.6%, breaking elongation CV value 6.7%, boiling water shrinkage rate 9.2%; wherein dye uptake rate is 87.9% (at 125° C.), K/S value is 23.02, color fastness to soaping reaches level 5, color fastness to dry crocking reaches level 5, and color fastness to wet crocking reaches level 4; wherein the intrinsic viscosity drops 16% after a storage at 25° C. and R.H. 65% for 60 months.

Example 7

A method for preparing an easy-to-dye degradable polyester FDY, comprising the steps:

(1) Preparation of Modified Polyester;

(1.1) Preparation of Solid Heteropolyacid Powder;

mixing $SiO_2$—$TiO_2$ powder, $B_2O_3$—$Al_2O_3$ powder and $SiO_2$—$ZrO_2$ powder with an average particle size of 0.45 μm at a mass ratio of 1:1:1. Among them, the content of $TiO_2$, $Al_2O_3$ and $ZrO_2$ is 50 wt %, 20 wt % and 20 wt %, respectively. The preparation methods of $SiO_2$—$TiO_2$ powder, $SiO_2$—$ZrO_2$ powder, and $B_2O_3$—$Al_2O_3$ powder are basically the same as those in Examples 1, 2 and 3, except for the degree of pulverization and the amount of materials added;

(1.2) Synthesis of 2,2,3,4,5,5-hexamethyl-3,4-hexanediol, which is the product of cooling, crystallization and refining of evenly mixed palladium acetate and di-tert-butyl dimethyl ethylene, adding a 13.5% mass concentration of hydrogen peroxide solution and reacting at 73° C. for 3.4 h, wherein the mass ratio of di-tert-butyl dimethyl ethylene, hydrogen peroxide solution and palladium acetate is 1:1.8:0.015, and the structural formula of 2,2,3,4,5,5-hexamethyl-3,4-hexanediol is shown in Formula (I);

(1.3) Synthesizing 2,6,6-trimethyl-5-tert-butyl-2,5-heptanediol (a) mixing isobutanol and 46% of KOH aqueous solution in the molar ratio of isobutanol to KOH as 5.5:1, then carrying out the reaction with a stirring at 100° C. for 4 h to obtain potassium isobutanol;

(b) removing the impurities from the system in step (a) and down to room temperature, then adding in xylene in the molar ratio of potassium isobutanol to xylene as 1.3:2.6 and cooling to 5° C.;

(c) adding 3-methyl-3-hydroxybutyne and 2,2,4,4-tetramethyl-3-pentanone into the system of step (b) in a molar ratio of 3-methyl-3-hydroxybutyne:2,2,4,4-tetramethyl-3-pentanone:xylene as 1:1.24:3.0, then starting the reaction at 25° C. for 3 h, and obtaining octyne diol after a series of processes of cooling crystallization, centrifugation and drying;

(d) mixing octyne diol, ethanol and palladium catalyst in a weight ratio of 3:10:0.03 and then carrying out the reaction accompanied with a continuous hydrogen input at 40° C. for 56 min, finally obtaining 2,6,6-trimethyl-5-tert-butyl-2,5-heptanediol (just as demonstrated in Formula (II) with R=—C(CH$_3$)$_3$) through a series of processes of separation and purification;

(1.4) Esterification concocting terephthalic acid, ethylene glycol, 2,2,3,4,5,5-hexamethyl-3,4-hexanediol and 2,6,6-trimethyl-5-tert-butyl-2,5-heptanediol into a slurry (in which the molar ration of terephthalic acid and ethylene glycol is 1:1.9, the total addition of 2,2,3,4,5,5-hexamethyl-3,4-hexanediol and 2,6,6-trimethyl-5-tert-butyl-2,5-heptanediol with a molar ratio of 2:5 is 3.5 mol % relative to the amount of terephthalic acid), and adding in 0.04 wt % of solid heteropolyacid powder, 0.04 wt % of antimony acetate, 0.22 wt % of titanium dioxide and 0.02 wt % of trimethyl phosphate (all are relative to the amount of terephthalic acid), then carrying out the esterification under a 0.2 MPa of nitrogen pressure at 255° C., finally ending the reaction when the water distillation rate reaches 95% of the theoretical value;

(1.5) Polycondensation after smoothly reducing the pressure from normal value to 400 Pa within 50 min, conducting the low vacuum polycondensation for the esterification products at 250° C. for 30 min, then further reducing the pressure to 85 Pa and continuing the high vacuum polycondensation at 280° C. for 50 min, finally obtaining the modified polyester with a molecular weight of 18200 Da and a molecular weight distribution index of 2.2;

(2) Preparing the modified polyester FDY, that is the easy-to-dye degradable polyester FDY from the modified polyester melt with FDY process including stages of metering, spinneret extruding (at 280° C.), cooling (at 18° C.), oiling, stretching as well as heat setting (carried on with the parameters of interlacing pressure 0.25 MPa, first godet roller speed 2000 m/min, first godet roller temperature 75° C., second godet roller speed 3400 m/min, second godet roller temperature 110° C.), and winding (3360 m/min).

The prepared easy-to-dye degradable polyester FDY has the performance indices of monofilament fineness 2.0 dtex, breaking strength 2.6 cN/dtex, elongation at break 41.0%, interlacing degree 15/m, linear density deviation rate 1.8%, breaking strength CV value 6.9%, breaking elongation CV value 7.2%, boiling water shrinkage rate 11.0%; wherein the dye uptake rate is 88.5% (at 125° C.), K/S value is 23.05, color fastness to soaping reaches level 5, color fastness to dry crocking reaches level 5, and color fastness to wet crocking is level 4-5; wherein the intrinsic viscosity drops 17% after a storage at 25° C. and R.H. 65% for 60 months.

Example 8

A method for preparing an easy-to-dye degradable polyester FDY, comprising the steps:

(1) Preparation of Modified Polyester;

(1.1) Preparation of Solid Heteropolyacid B$_2$O$_3$-Al$_2$O$_3$ Powder;

the preparation method is basically the same as those in step (1.1) of Example 3, except for the degree of pulverization and the amount of materials added. The prepared solid heteropolyacid B$_2$O$_3$—Al$_2$O$_3$ powder has an average size of 0.4 μm and the Al$_2$O$_3$ content of B$_2$O$_3$—Al$_2$O$_3$ is 40 wt %;

(1.2) Synthesis of 2,2,3,4,5,5-hexamethyl-3,4-hexanediol, the preparation method is basically the same as those in step (1.2) of Example 7;

(1.3) Synthesizing 2,6,6-trimethyl-5-tert-butyl-2,5-heptanediol (a) mixing isobutanol and 40% of KOH aqueous solution in the molar ratio of isobutanol to KOH as 6:1, then carrying out the reaction with a stirring at 102° C. for 4.5 h to obtain potassium isobutanol;

(b) removing the impurities from the system in step (a) and down to room temperature, then adding in xylene in the molar ratio of potassium isobutanol to xylene as 1.5:3.0 and cooling to 5° C.;

(c) adding 3-methyl-3-hydroxybutyne and 2,2,4,4-tetramethyl-3-pentanone into the system of step (b) in a molar ratio of 3-methyl-3-hydroxybutyne:2,2,4,4-tetramethyl-3-pentanone:xylene as 1:1.28:2.4, then starting the reaction at 30° C. for 3 h, and obtaining octyne diol after a series of processes of cooling crystallization, centrifugation and drying;

(d) mixing octyne diol, ethanol and palladium catalyst in a weight ratio of 2.2:10:0.02 and then carrying out the reaction accompanied with a continuous hydrogen input at 50° C. for 60 min, finally obtaining 2,6,6-trimethyl-5-tert-butyl-2,5-heptanediol (just as demonstrated in Formula (II) with R=—C(CH$_3$)$_3$) through a series of processes of separation and purification;

(1.4) Esterification concocting terephthalic acid, ethylene glycol, 2,2,3,4,5,5-hexamethyl-3,4-hexanediol and 2,6,6-trimethyl-5-tert-butyl-2,5-heptanediol into a slurry (in which the molar ration of terephthalic acid and ethylene glycol is 1:1.4, the total addition of 2,2,3,4,5,5-hexamethyl-3,4-hexanediol and 2,6,6-trimethyl-5-tert-butyl-2,5-heptanediol with a molar ratio of 2:4 is 4 mol % relative to the amount of terephthalic acid), and adding in 0.03 wt % of solid heteropolyacid B$_2$O$_3$—Al$_2$O$_3$ powder, 0.03 wt % of antimony glycol, 0.20 wt % of titanium dioxide and 0.01-0.05 wt % of trimethyl phosphite (all are relative to the amount of terephthalic acid), then carrying out the esterification under a 0.25 MPa of nitrogen pressure at 255° C., finally ending the reaction when the water distillation rate reaches 90% of the theoretical value;

(1.5) Polycondensation after smoothly reducing the pressure from normal value to 400 Pa within 30 min, conducting the low vacuum polycondensation for the esterification products at 250° C. for 30 min, then further reducing the pressure to 80 Pa and continuing the high vacuum polycondensation at 282° C. for 90 min, finally obtaining the modified polyester with a molecular weight of 18200 Da and a molecular weight distribution index of 2.4;

(2) Preparing the modified polyester FDY, that is the easy-to-dye degradable polyester FDY from the modified polyester melt with FDY process including stages of metering, spinneret extruding (at 285° C.), cooling (at 18° C.), oiling, stretching as well as heat setting (carried on with the parameters of interlacing pressure 0.25 MPa, first godet roller speed 1900 m/min, first godet roller temperature 85° C., second godet roller speed 3200 m/min, second godet roller temperature 100° C.), and winding (3150 m/min).

The prepared easy-to-dye degradable polyester FDY has the performance indices of monofilament fineness 1.8 dtex, breaking strength 2.6 cN/dtex, elongation at break 40.0%, interlacing degree 15/m, linear density deviation rate 1.7%, breaking strength CV value 7.1%, breaking elongation CV value 7.3%, boiling water shrinkage rate 9.7%; wherein the dye uptake rate is 88.3% (at 125° C.), K/S value is 22.99, color fastness to soaping reaches level 5, color fastness to dry crocking reaches level 5, and color fastness to wet crocking is level 4-5; wherein the intrinsic viscosity drops 18% after a storage at 25° C. and R.H. 65% for 60 months.

Examples 9-12

A method for preparing an easy-to-dye degradable polyester FDY, is basically the same as those in Example 8, except for the solid heteropolyacid added and the performance indices of the final product (See Table 1 and Table 2 below for details). The preparation method of solid heteropolyacid powder is basically the same as those in Example 1-5, except for the degree of pulverization and the amount of materials added. In the Table 2, A, B, C, D, E, F, G and H is monofilament fineness (dtex), breaking strength (cN/dtex), elongation at break (%), interlacing degree (/m), linear density deviation rate (%), breaking strength CV value (%), breaking elongation CV value (%), and boiling water shrinkage rate (%) of the fiber, respectively; under the temperature of at 125° C., I, J, K, L and M is dye uptake rate (%), K/S value, color fastness to soaping (level), color fastness to dry crocking (level), and color fastness to wet crocking (level) of the fiber, respectively; N is an intrinsic viscosity drop after a storage at 25° C. and R.H. 65% for 60 months, with the unit %.

TABLE 1

| Number of Examples (No.) | Powder addition |
|---|---|
| 9 | Solid TiO$_2$-ZnO Powder (the content of ZnO is 20 wt %) |
| 10 | Solid TiO$_2$-ZnO Powder (the content of ZnO is 40 wt %) |
| 11 | Solid SiO$_2$-CaO Powder (the content of CaO is 20 wt %) |
| 12 | Solid SiO$_2$-CaO Powder (the content of CaO is 50 wt %) |

TABLE 2

| No. | A | B | C | D | E | F | G | H | I | J | K | L | M | N |
|---|---|---|---|---|---|---|---|---|---|---|---|---|---|---|
| 9 | 1.9 | 2.5 | 39.5 | 16 | 1.8 | 7.0 | 7.0 | 9.9 | 88.2 | 23.14 | 5 | 5 | 4-5 | 18 |
| 10 | 1.9 | 2.6 | 40.1 | 15 | 1.7 | 7.1 | 7.3 | 10 | 88.5 | 23.38 | 5 | 5 | 5 | 19 |
| 11 | 1.8 | 2.6 | 39.9 | 14 | 1.9 | 7.2 | 7.0 | 9.3 | 87.8 | 22.84 | 5 | 5 | 4-5 | 17 |
| 12 | 1.9 | 2.5 | 39.5 | 17 | 1.8 | 7.0 | 7.3 | 9.8 | 88.1 | 24.04 | 5 | 5 | 5 | 19 |

What is claimed is:

1. A preparing method for an easy-to-dye degradable polyester fully drawn yarn (FDY), comprising preparing a modified polyester FDY from a modified polyester melt with a FDY process;

wherein the modified polyester is prepared by an esterification reaction and successive polycondensation reactions of an evenly mixed mixture consisting of terephthalic acid, ethylene glycol, 2,2,3,4,5,5-hexamethyl-3,4-hexanediol, tert-butyl branched heptanediol and solid heteropolyacid powder calcined at a predetermined temperature;

wherein a structural formula of the 2,2,3,4,5,5-hexamethyl-3,4-hexanediol is as follows:

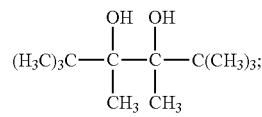

wherein a structural formula of the tert-butyl branched heptanediol is as follows:

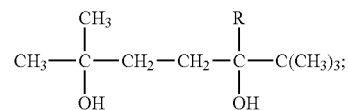

wherein R is one selected form the group consisting of —H, —CH$_2$CH$_3$, —CH(CH$_3$)$_2$ and —C(CH$_3$)$_3$;

wherein the solid heteropolyacid powder is calcined at 400-700° C., and the solid heteropolyacid powder is more than one selected from the group consisting of SiO$_2$—TiO$_2$, SiO$_2$—ZrO$_2$, B$_2$O$_3$—Al$_2$O$_3$, TiO$_2$—ZnO, and SiO$_2$—CaO.

2. The preparing method of claim 1, wherein the 2,2,3,4,5,5-hexamethyl-3,4-hexanediol is synthesized by cooling, crystallization and refining of evenly mixed palladium acetate and di-tert-butyl dimethyl ethylene, under heating and stirring conditions, adding a 10-15% mass concentration of hydrogen peroxide solution and reacting at 70-75° C. for 3-4 h, wherein a mass ratio of the di-tert-butyl dimethyl ethylene, the hydrogen peroxide solution and the palladium acetate is 1:1.5-2.0:0.015;

wherein the tert-butyl branched heptanediol is synthesized by means of:

(1) mixing isobutanol and a 40-50% of KOH aqueous solution in a molar ratio of the isobutanol to the 40-50% KOH aqueous solution as 5-6:1 to obtain a first mixture, then carrying out a first reaction on the first mixture with a stirring at 100-110° C. for 4-5 h to obtain potassium isobutanol;

(2) removing impurities from the potassium isobutanol in step (1) and downing to room temperature, then adding in xylene to the potassium isobutanol in a molar ratio of the potassium isobutanol to the xylene as 1.3-1.5: 2.0-3.0 and cooling to 0-5° C. to obtain a second mixture;

(3) adding 3-methyl-3-hydroxybutyne and M into the second mixture in step (2) in a molar ratio of the 3-methyl-3-hydroxybutyne: the M: the xylene as 1:1.2-1.3:2.0-3.0 to obtain a third mixture, then performing a second reaction on the third mixture at 25-35° C. for 3 h to obtain a fourth mixture, and obtaining octyne diol after a cooling and a crystallization, a centrifugation and a drying on the fourth mixture;

(4) mixing the octyne diol, ethanol and a palladium catalyst in a weight ratio of 2-3:10:0.01-0.03 to obtain a fifth mixture, then carrying out a third reaction on the fifth mixture accompanied with a continuous hydrogen input at 40-50° C. for 50-60 min to obtain a sixth mixture, and obtaining the tert-butyl branched heptanediol after a separation and a purification on the sixth mixture;

wherein in the structural formula of the tert-butyl branched heptanediol, when the R is the H, the —$CH_2CH_3$, the —$CH(CH_3)_2$ or the —$C(CH_3)_3$, the M is 2,2-dimethylpropionaldehyde, 2,2-dimethyl-3-pentanone, 2,2,4-trimethyl-3-pentanone or 2,2,4,4-tetramethyl-3-pentanone;

wherein the solid heteropolyacid powder is calcined for 2-4 h; contents of $TiO_2$, $ZrO_2$, $Al_2O_3$, ZnO and CaO in the $SiO_2$—$TiO_2$, the $SiO_2$—$ZrO_2$, the $B_2O_3$—$Al_2O_3$, the $TiO_2$—ZnO, and the $SiO_2$—CaO is respectively 30-50 wt %, 30-50 wt %, 20-40 wt %, 20-40 wt % and 20-50 wt %; wherein the solid heteropolyacid powder calcined at the predetermined temperature is crushed into powder with an average size of less than 0.5 μm.

3. The preparing method of claim 2, wherein the modified polyester is prepared by the following steps:
(1) esterification
concocting the terephthalic acid, the ethylene glycol, the 2,2,3,4,5,5-hexamethyl-3,4-hexanediol and the tert-butyl branched heptanediol into a slurry, and adding in the solid heteropolyacid powder calcined at the predetermined temperature, a catalyst, a matting agent and a stabilizer to the slurry to obtain a seventh mixture, then carrying out the esterification reaction on the seventh mixture under a nitrogen pressure ranged from an atmospheric pressure to 0.3 MPa to obtain an esterification product, wherein a temperature of the esterification reaction is 250-260° C., finally ending the esterification reaction when a water distillation rate reaches higher than 90% of a theoretical value;
(2) polycondensation
after smoothly reducing the nitrogen pressure from the atmospheric pressure to less than 500 Pa within 30-50 min, conducting a first polycondensation reaction for the esterification product at 250-260° C. for 30-50 min to obtain a first polycondensation product, then further reducing the nitrogen pressure to less than 100 Pa and performing a second polycondensation reaction on the first polycondensation product at 270-282° C. for 50-90 min.

4. The preparing method of claim 3, wherein a molar ratio of the terephthalic acid and the ethylene glycol is 1:1.2-2.0, a total addition of the 2,2,3,4,5,5-hexamethyl-3,4-hexanediol and the tert-butyl branched heptanediol is 3-5 mol % of an amount of the terephthalic acid, wherein a molar ratio of the 2,2,3,4,5,5-hexamethyl-3,4-hexanediol and the tert-butyl branched heptanediol is 2-3:3-5, wherein additions of the solid heteropolyacid powder calcined at the predetermined temperature, the catalyst, the matting agent and the stabilizer are 0.03-0.05 wt %, 0.03-0.05 wt %, 0.20-0.25 wt % and 0.01-0.05 wt % of the amount of the terephthalic acid respectively.

5. The preparing method of claim 4, wherein the catalyst is one selected from the group consisting of antimony trioxide, antimony glycol and antimony acetate, the matting agent is titanium dioxide, and the stabilizer is one selected from the group consisting of triphenyl phosphate, trimethyl phosphate and trimethyl phosphite.

6. The preparing method of claim 5, wherein the modified polyester has a molecular weight of 17000-19000 Da and the modified polyester has a molecular weight distribution index of 2.0-2.4.

7. The preparing method of claim 1, wherein the FDY process comprises steps of a metering, a spinneret extruding, a cooling, an oiling, a stretching, a heat setting and a winding;
wherein technological parameters of the FDY process are chosen as follows: a spinning temperature of 280-290° C., a cooling temperature of 18-20° C., an interlacing pressure of 0.20-0.30 MPa, a first godet roller speed of 1800-2200 m/min, a first godet roller temperature of 75-90° C., a second godet roller speed of 3200-3400 m/min, a second godet roller temperature of 100-115° C., a winding speed of 3150-3360 m/min.

8. An easy-to-dye degradable polyester FDY manufactured by the preparing method of claim 1, wherein a material of the easy-to-dye degradable polyester FDY is the modified polyester;
wherein a molecular chain of the modified polyester comprises terephthalic acid segments, ethylene glycol segments, 2,2,3,4,5,5-hexamethyl-3,4-hexanediol segments and tert-butyl branched heptanediol segments;
wherein the solid heteropolyacid powder calcined the predetermined temperature is dispersed in the modified polyester.

9. The easy-to-dye degradable polyester FDY of claim 8, wherein the easy-to-dye degradable polyester FDY has the following performance indices as a monofilament fineness of 1.5-3.0 dtex, a breaking strength of ≥2.5 cN/dtex, an elongation at break of 40.0±2.0%, an interlacing degree of 15±2/m, a linear density deviation rate of ≤2.0%, a breaking strength CV value of ≤8.0%, a breaking elongation CV value of ≤8.0%, a boiling water shrinkage rate of 10.0±1.5%.

10. The easy-to-dye degradable polyester FDY of claim 8, wherein at 125° C., a dye uptake is 87.3-90.7%, a K/S value is 22.32-25.53, a color fastness to soaping reaches level 5, a color fastness to dry crocking reaches level 5, and a color fastness to wet crocking is higher than level 4; wherein the easy-to-dye degradable polyester FDY has an intrinsic viscosity drop of 15-21% after a storage at 25° C. and a relative humidity (R.H.) of 65% for 60 months.

11. The easy-to-dye degradable polyester FDY of claim 8, wherein the 2,2,3,4,5,5-hexamethyl-3,4-hexanediol is synthesized by cooling, crystalization and refining of evenly mixed palladium acetate and di-tert-butyl dimethyl ethylene, under heating and stirring conditions, adding a 10-15% mass concentration of hydrogen peroxide solution and reacting at 70-75° C. for 3-4 h, wherein a mass ratio of the di-tert-butyl dimethyl ethylene, the hydrogen peroxide solution and the palladium acetate is 1:1.5-2.0:0.015;
wherein the tert-butyl branched heptanediol is synthesized by means of:
(1) mixing isobutanol and a 40-50% of KOH aqueous solution in a molar ratio of the isobutanol to the 40-50% KOH aqueous solution as 5-6:1 to obtain a first mixture, then carrying out a first reaction on the first mixture with a stirring at 100-110° C. for 4-5 h to obtain potassium isobutanol;
(2) removing impurities from the potassium isobutanol in step (1) and downing to room temperature, then adding in xylene to the potassium isobutanol in a molar ratio of the potassium isobutanol to the xylene as 1.3-1.5: 2.0-3.0 and cooling to 0-5° C. to obtain a second mixture;

(3) adding 3-methyl-3-hydroxybutyne and M into the second mixture in step (2) in a molar ratio of the 3-methyl-3-hydroxybutyne: the M: the xylene as 1:1.2-1.3:2.0-3.0 to obtain a third mixture, then performing a second reaction on the third mixture at 25-35° C. for 3 h to obtain a fourth mixture, and obtaining octyne diol after a cooling and a crystallization, a centrifugation and a drying on the fourth mixture;

(4) mixing the octyne diol, ethanol and a palladium catalyst in a weight ratio of 2-3:10:0.01-0.03 to obtain a fifth mixture, then carrying out a third reaction on the fifth mixture accompanied with a continuous hydrogen input at 40-50° C. for 50-60 min to obtain a sixth mixture, and obtaining the tert-butyl branched heptanediol after a separation and a purification on the sixth mixture;

wherein in the structural formula of the tert-butyl branched heptanediol, when the R is the —H, the —$CH_2CH_3$, the —$CH(CH_3)_2$ or the —$C(CH_3)_3$, the M is 2,2-dimethylpropionaldehyde, 2,2-dimethyl-3-pentanone, 2,2,4-trimethyl-3-pentanone or 2,2,4,4-tetramethyl-3-pentanone;

wherein the solid heteropolyacid powder is calcined for 2-4 h; contents of $TiO_2$, $ZrO_2$, $Al_2O_3$, ZnO and CaO in the $SiO_2$—$TiO_2$, the $SiO_2$—$ZrO_2$, the $B_2O_3$—$Al_2O_3$, the $TiO_2$—ZnO, and the $SiO_2$—CaO is respectively 30-50 wt %, 30-50 wt %, 20-40 wt %, 20-40 wt % and 20-50 wt %; wherein the solid heteropolyacid powder calcined at the predetermined temperature is crushed into powder with an average size of less than 0.5 μm.

12. The easy-to-dye degradable polyester FDY of claim 11, wherein the modified polyester is prepared by the following steps:

(1) esterification concocting the terephthalic acid, the ethylene glycol, the 2,2,3,4,5,5-hexamethyl-3,4-hexanediol and the tert-butyl branched heptanediol into a slurry, and adding in the solid heteropolyacid powder calcined at the predetermined temperature, a catalyst, a matting agent and a stabilizer to the slurry to obtain a seventh mixture, then carrying out the esterification reaction on the seventh mixture under a nitrogen pressure ranged from an atmospheric pressure to 0.3 MPa to obtain an esterification product, wherein a temperature of the esterification reaction is 250-260° C., finally ending the esterification reaction when a water distillation rate reaches higher than 90% of a theoretical value;

(2) polycondensation after smoothly reducing the nitrogen pressure from the atmospheric pressure to less than 500 Pa within 30-50 min, conducting a first polycondensation reaction for the esterification product at 250-260° C. for 30-50 min to obtain a first polycondensation product, then further reducing the nitrogen pressure to less than 100 Pa and performing a second polycondensation reaction on the first polycondensation product at 270-282° C. for 50-90 min.

13. The easy-to-dye degradable polyester FDY of claim 12, wherein a molar ratio of the terephthalic acid and the ethylene glycol is 1:1.2-2.0, a total addition of the 2,2,3,4,5,5-hexamethyl-3,4-hexanediol and the tert-butyl branched heptanediol is 3-5 mol % of an amount of the terephthalic acid, wherein a molar ratio of the 2,2,3,4,5,5-hexamethyl-3,4-hexanediol and the tert-butyl branched heptanediol is 2-3:3-5, wherein additions of the solid heteropolyacid powder calcined at the predetermined temperature, the catalyst, the matting agent and the stabilizer are 0.03-0.05 wt %, 0.03-0.05 wt %, 0.20-0.25 wt % and 0.01-0.05 wt % of the amount of the terephthalic acid respectively.

14. The easy-to-dye degradable polyester FDY of claim 13, wherein the catalyst is one selected from the group consisting of antimony trioxide, antimony glycol and antimony acetate, the matting agent is titanium dioxide, and the stabilizer is one selected from the group consisting of triphenyl phosphate, trimethyl phosphate and trimethyl phosphite.

15. The easy-to-dye degradable polyester FDY of claim 14, wherein the modified polyester has a molecular weight of 17000-19000 Da and the modified polyester has a molecular weight distribution index of 2.0-2.4.

16. The easy-to-dye degradable polyester FDY of claim 8, wherein the FDY process comprises steps of a metering, a spinneret extruding, a cooling, an oiling, a stretching, a heat setting and a winding;

wherein technological parameters of the FDY process are chosen as follows: a spinning temperature of 280-290° C., a cooling temperature of 18-20° C., an interlacing pressure of 0.20-0.30 MPa, a first godet roller speed of 1800-2200 m/min, a first godet roller temperature of 75-90° C., a second godet roller speed of 3200-3400 m/min, a second godet roller temperature of 100-115° C., a winding speed of 3150-3360 m/min.

* * * * *